United States Patent
Park et al.

(10) Patent No.: US 9,961,635 B2
(45) Date of Patent: May 1, 2018

(54) METHOD AND APPARATUS FOR OPERATING BASED ON POWER SAVE MODE IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 15/110,705

(22) PCT Filed: Jan. 12, 2015

(86) PCT No.: PCT/KR2015/000287
§ 371 (c)(1),
(2) Date: Jul. 8, 2016

(87) PCT Pub. No.: WO2015/105389
PCT Pub. Date: Jul. 16, 2015

(65) Prior Publication Data
US 2016/0337969 A1 Nov. 17, 2016

Related U.S. Application Data

(60) Provisional application No. 61/925,651, filed on Jan. 10, 2014, provisional application No. 62/081,022, filed on Nov. 18, 2014.

(51) Int. Cl.
*H04W 52/02* (2009.01)
*H04W 28/02* (2009.01)
(Continued)

(52) U.S. Cl.
CPC ... *H04W 52/0216* (2013.01); *H04W 28/0221* (2013.01); *H04L 47/245* (2013.01);
(Continued)

(58) Field of Classification Search
None
See application file for complete search history.

(56) References Cited

U.S. PATENT DOCUMENTS 7,136,392 B2 * 11/2006 Wentink ............. H04L 47/6215
370/412
2002/0085582 A1 * 7/2002 Kim .................. H04L 47/10
370/445

(Continued)

FOREIGN PATENT DOCUMENTS

| KR | 1020090132592 A | 12/2009 |
|----|----|----|
| WO | 2013129861 A1 | 9/2013 |
| WO | 2013151335 A1 | 10/2013 |

*Primary Examiner* — Anh Ngoc Nguyen
(74) *Attorney, Agent, or Firm* — Lee, Hong, Degerman, Kang & Waimey PC (57) ABSTRACT

Disclosed are a method and an apparatus for operating based on a power save mode in a wireless LAN. The method for operating based on the power save mode in a wireless LAN may comprise the steps of: an AP receiving, from a first STA, a first trigger frame for triggering the transmission of first downlink data which has been buffered for the first STA; the AP determining a temporary halt of the transmission the first downlink data, which is transmitted as a response to the first trigger frame, based on a first priority rank of the first downlink data which has been buffered for the first STA, a second priority rank of second downlink data which has been buffered for a second STA, and a point when the second STA is switched to an awake state; and the AP transmitting, to the first STA, a temporary halt setting frame for indicating the temporary halt.

12 Claims, 8 Drawing Sheets

(51) Int. Cl.
 H04W 84/12 (2009.01)
 H04L 12/851 (2013.01)
 H04W 88/08 (2009.01)

(52) U.S. Cl.
 CPC ............ *H04W 84/12* (2013.01); *H04W 88/08* (2013.01); *Y02B 60/50* (2013.01)

(56) References Cited

U.S. PATENT DOCUMENTS

| | | |
|---|---|---|
| 2005/0213534 A1 | 9/2005 | Benveniste |
| 2006/0039395 A1* | 2/2006 | Perez-Costa ...... H04W 72/1247 370/412 |
| 2007/0147284 A1 | 6/2007 | Sammour et al. |
| 2012/0120796 A1* | 5/2012 | Chu ................. H04W 74/0808 370/230 |

\* cited by examiner

METHOD AND APPARATUS FOR OPERATING BASED ON POWER SAVE MODE IN WIRELESS LAN

CROSS-REFERENCE TO RELATED APPLICATIONS

This application is the National Stage filing under 35 U.S.C. 371 of International Application No. PCT/KR2015/000287, filed on Jan. 12, 2015, which claims the benefit of U.S. Provisional Application No. 61/925,651, filed on Jan. 10, 2014 and 62/081,022, filed on Nov. 18, 2014, the contents of which are all hereby incorporated by reference herein in their entirety.

BACKGROUND OF THE INVENTION

Field of the Invention

The present invention relates to wireless communication, and more particularly, to a method and an apparatus for operating based on a power save mode in a wireless local area network (WLAN).

Related Art

In IEEE 802.11, a power saving mechanism (or power saving mode) may be used to increase the life of a wireless local area network (WLAN) station (STA). An STA operating based on the power saving mode is capable of operating in an awake state or doze state in order to save power. The awake state is a state in which normal operations of the STA, such as frame transmission or reception or channel scanning, are possible. The doze state is a state in which power consumption is drastically reduced to make it impossible to transmit or receive a frame and to perform channel scanning. The STA operating in the power saving mode is usually in the doze state and switches to the awake state if necessary to reduce power consumption.

When the STA is operating for a long time in the doze state, power consumption of the STA is reduced. Accordingly, the life of the STA may increase. However, in the doze state, it is impossible to transmit or receive a frame. Thus, the STA may not stay for a long time in the doze state. When the STA has a pending frame in the doze state, the STA may switch to the awake state to transmit the frame to an AP. However, when the STA is in the doze state and the AP has a pending frame to transmit to the STA, the STA may not receive the pending frame from the AP and does not recognize that the AP has the pending frame. Accordingly, the STA may periodically switch to the awake mode to operate in order to acquire information on whether the AP has a pending frame and to receive the pending frame from the AP.

The AP may acquire information on an awake-mode operation timing of the STA and transmit information on whether the AP has a pending frame according to the awake-mode operation timing of the STA.

Specifically, the STA in the doze state may periodically switch from the doze state to the awake state to receive a beacon signal in order to receive information on whether there is a frame to receive from the AP. The AP may notify whether there is a frame to transmit to each STA based on a traffic indication map (TIM) included in the beacon frame. The TIM may be used to indicate the presence of a unicast frame to be transmitted to the STA, and a delivery traffic indication map (DTIM) may be used to indicate the presence of a multicast frame/broadcast frame to be transmitted to the STA.

SUMMARY OF THE INVENTION

The present invention provides a method for operating based on a power save mode in a wireless LAN.

The present invention also provides an apparatus for operating based on a power save mode in a wireless LAN.

In an aspect, provided is a method for operating based on a power save mode in a wireless LAN. The method includes: receiving, by an access point (AP), a first trigger frame triggering transmission of first downlink data buffered with respect to a first station (STA) from the first STA; deciding, by the AP, hold-off of the transmission of the first downlink data transmitted as a response to the first trigger frame based on a first priority of the first downlink data buffered with respect to the first STA, a second priority of second downlink data buffered with respect to a second STA, and a switch point to the second STA; and transmitting, by the AP, a hold off configuration frame indicating the hold-off to the first STA, wherein the first priority is lower than the second priority, and the switch point is duplicated with duration for transmitting the buffered first downlink data.

In another aspect, provided is an AP for operating based on a power save mode in a wireless LAN. The AP includes: a radio frequency (RF) unit implemented to transmit or receive a radio signal; and a processor operatively connected with the RF unit, wherein the processor is implemented to receive a first trigger frame triggering transmission of first downlink data buffered with respect to a first station (STA) from the first STA, decide hold-off of the transmission of the first downlink data transmitted as a response to the first trigger frame based on a first priority of the first downlink data buffered with respect to the first STA, a second priority of second downlink data buffered with respect to a second STA, and a switch point to the second STA, and transmit a hold off configuration frame indicating the hold-off to the first STA, the first priority is lower than the second priority, and the switch point is duplicated with duration for transmitting the buffered first downlink data.

An AP preferentially transmits downlink data to a high priority QoS STA to reduce a service delay.

DESCRIPTION OF EXEMPLARY EMBODIMENTS

Figure 1:
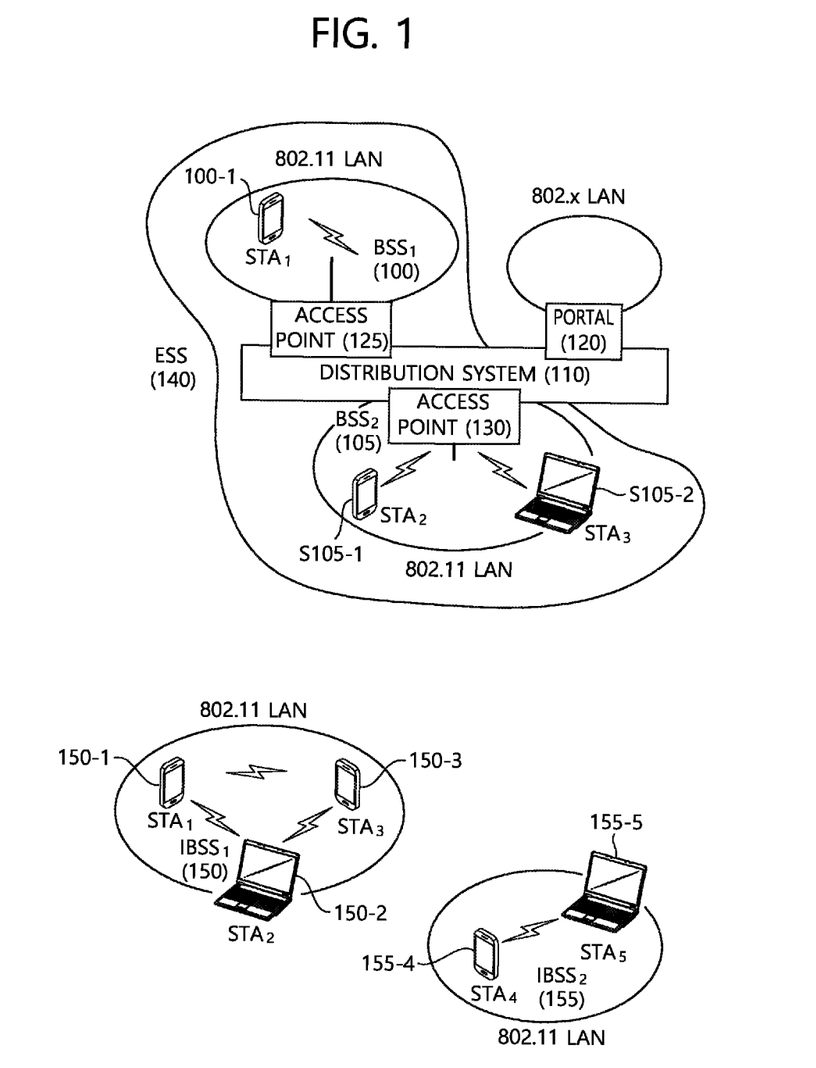
FIG. 1 is a concept view illustrating the structure of a wireless local area network (WLAN).

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (alternatively, or a frame) which an AP transmits to an STA may be expressed as downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

The STA that operates in the power save mode in the wireless LAN in the related art may operate based on an unscheduled automatic power save delivery (U-APSD), scheduled automatic power save delivery (S-APSD), or power save poll technique. When the STA uses the U-APSD and the S-APSD, it may be difficult to support a real time application (for example, voice over internet protocol (VoIP)) in real time.

Figure 2:
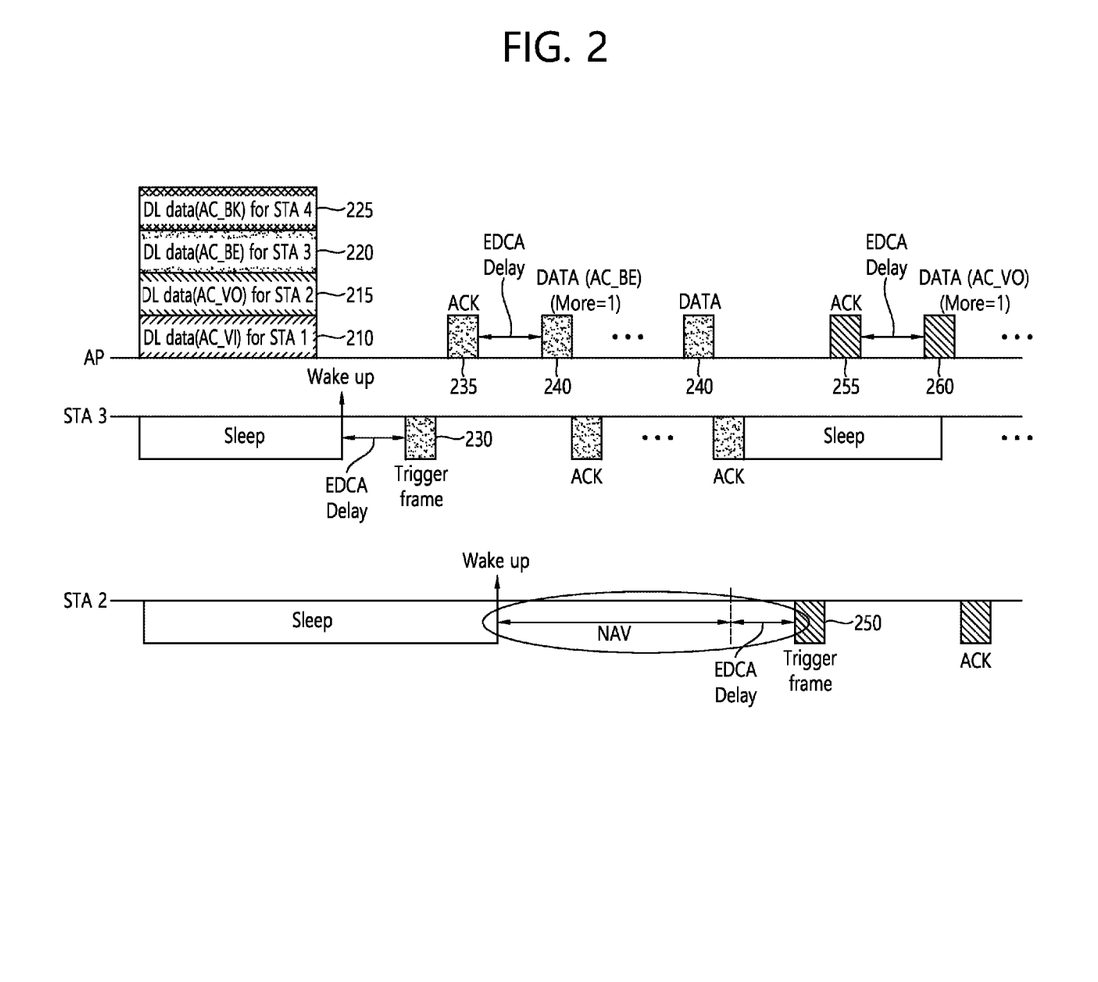
FIG. 2 is a conceptual view illustrating a U-APSD procedure in the related art.

FIG. 2 is a conceptual view illustrating a U-APSD procedure in the related art.

In FIG. 2, an increase problem of a service delay which may occur when the U-APSD is used is disclosed.

Hereinafter, AC_VO, AC_VI, AC_BE, and AC_BK are examples for a category for classifying priorities (alternatively, transmission priorities) of data. The priorities of the data may be classified based on categories other than AC_VO, AC_VI, AC_BE, and AC_BK.

Referring to FIG. 2, downlink data 210 corresponding to access category_video (AC_VI) to be transmitted to STA1, downlink data 215 corresponding to access category_voice (AC_VO) to be transmitted to STA2, downlink data 220 corresponding to access category_best effort (AC_BE) to be transmitted to STA3, and downlink data 225 corresponding to access category_backgroud (AC_BK) to be transmitted STA4 may be pended to the AP.

The downlink data may have a high priority in the order of AC_VO, AC_VI, AC_BE, and AC_BK. That is, when only the priority is considered, the AP needs to first transmit the downlink data corresponding to AC_VO and last transmit the downlink data 225 corresponding to AC_BK.

However, time intervals (alternatively, listen intervals) for doze states (alternatively, sleep modes) awake states (alternatively, active modes) of the respective STA1, STA2, STA3, and STA4 may be different from each other or start timings of the respective states (alternatively, listen intervals) may be different from each other even though the time intervals (alternatively, listen intervals) are the same as each other. Therefore, transmission timings of trigger frames of the plurality of respective STAs that request the transmission of the frame pended to the AP may also be different from each other. The trigger frame may be a frame for requesting transmission of the downlink data pended to the AP.

In FIG. 2, it is assumed that the STA3 is switched to the awake state earlier than the STA to transmit a trigger frame 230 to the AP.

The STA3 may be switched to the awake state earlier than the STA2 and the STA3 may transmit the trigger frame 230 to the AP after being switched to the awake state. The AP may receive the trigger frame 230 from the STA3, transmit an ACK frame for the trigger frame 230, and transmit a downlink frame 240 including the downlink data corresponding to AC_BE pended to the STA3. When a value of a moredata field included in the downlink frame 240 is 1, the moredata field value of 1 may indicate that the downlink data additionally pended to the STA3 remains in the AP. Contrary to this, when the value of the moredata field included in the downlink frame 240 is 0, the moredata field value of 0 may indicate that the downlink data additionally pended to the STA3 does not remain in the AP.

The STA2 may be switched from the doze state to the awake state while the AP transmits the downlink data to the STA3. After the STA2 is switched to the awake state, the STA2 may not acquire a medium for transmitting the trigger frame but configure a network allocation vector (NAV) due to the downlink frame 240 and the ACK frame 235 transmitted or received between the AP an the STA2.

The STA2 may acquire the medium and transmit a trigger frame 250 to the AP after communication between the AP and the STA3 ends. The AP may receive the trigger frame 250 transmitted by the STA2, transmit an ACK frame 255 as a response to the trigger frame 250, and transmit to the STA2 a downlink frame 260 including the downlink data corresponding to AC_VO pended to the STA2.

That is, in the U-APSD in the related art, a high priority quality of service STA such as the STA3 is switched to the awake state later (alternatively, awakes later) than a relatively low priority QoS STA such as STA2 to transmit the trigger frame. The high priority quality of service STA may be an STA that will receive relatively higher priority pended downlink data and the low priority QoS STA may be an STA that will receive relatively lower priority pended downlink data.

In this case, transmission of the downlink data to the high priority QoS STA may be performed after transmission of the downlink data (for example, buffered units (BUs)) to the low priority QoS STA ends. In this case, the service delay for the high priority QoS STA may increase.

Hereinafter, in an embodiment of the present invention, a method for reducing the service delay for the high priority QoS STA in the U-APSD is disclosed.

Figure 3:
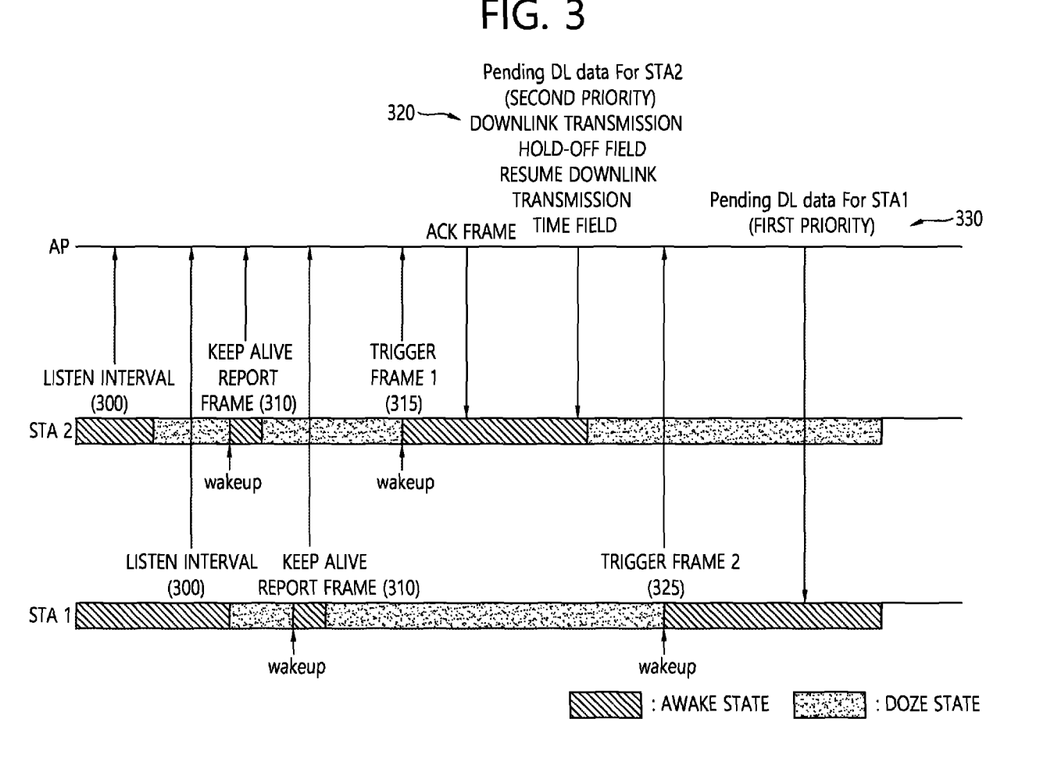
FIG. 3 is a conceptual view illustrating a U-APSD procedure according to an embodiment of the present invention.

FIG. 3 is a conceptual view illustrating a U-APSD procedure according to an embodiment of the present invention.

In FIG. 3, a method in which the AP holds off (alternatively, holds off) transmission of relatively lower priority buffer (alternatively, pended) data among the pended downlink data and preferentially transmits relatively higher priority buffered data is disclosed.

In detail, a plurality of downlink data units may be pended (alternatively, buffered) corresponding to different access categories (alternatively, classes or priorities) (hereinafter, referred to as priorities) may be pended to the AP. In detail, when it is assumed that a first priority is a priority relatively higher than a second priority, downlink data having the second priority relatively lower than the first priority and downlink data having the first priority relatively higher than the second priority may be pended to the AP.

It may be assumed that the downlink data having the first priority pended to the STA1 and the downlink data having the second priority pended to the STA2 are pended to the AP. According to the embodiment of the present invention, while the downlink data having the second priority pended to the STA2 is transmitted to the STA2, when transmission of the downlink data having the first priority pended to the STA1 to the STA1 is available, the AP may hold off (alternatively, delay) the transmission of the downlink data having the second priority to the STA2 and perform the transmission of the downlink data having the first priority to the STA1.

The AP may find whether the STA receives the downlink data having the first priority in order to hold off the transmission of the downlink data having the second priority and transmit the downlink data having the first priority. For example, when it is determined that the STA1 that will receive the downlink data having the first priority is switched to the awake state and the STA1 is within a serviceable range of the AP while transmitting the downlink data having the second priority to the STA2, the AP may stop the transmission of the downlink data to the STA2 and transmit the downlink data having the first priority to the STA1.

In detail, the AP may perform a U-APSD operation considering the priority of the downlink data of the AP according to the embodiment of the present invention based on information 300 on a listen interval of the STA, information indicating whether the STA that will receive the buffered (alternatively, pended) downlink data, and information indicating the priority of the downlink data pended to the coupled STA.

The information 300 on the listen interval of the STA may be transmitted to the AP through a coupling request frame transmitted by the STA at the time of coupling the STA. The listen interval may be an inter-state switch interval of the STA that operates in the awake state or the doze state based on a power saving mode. The STA that operates based on the U-APSD maintains the doze state during a predetermined interval and awakes and is switched to the awake state to transmit the trigger frame to the AP. The listen interval may be a time interval between an end time of a current awake state and a start time of a next awake state of the STA. As another expression, the listen interval may be an interval between a maintenance time of the doze state of the STA and a wake-up time of the STA. The AP may decide whether the STA operates in an awake mode based on the listen interval of the STA.

Information indicating whether the STA that will receive the buffered (alternatively, pended) downlink data receives the buffered (alternatively, pended) downlink data is information indicating whether the STA is positioned within a service range of the AP. For example, the STA is periodically switched from the doze state to the awake state to transmit a keep alive check report frame (alternatively, a keep alive report frame) 310 to the AP. The keep alive report frame 310 may be used to announce whether the STA is present in coverage of the AP. The AP may periodically verify that the STA is positioned in a serviceable region (alternatively, a transmission coverage range) of the AP based on the keep alive report frame 310 transmitted by the STA.

For example, the AP may decide the listen interval of the STA, information on an STA (serviceable STA) that is positioned in a current serviceable region based on the keep alive check report frame 310 transmitted by the STA, and an STA (awake-state STA) which is in the awake state among the STAs positioned in the serviceable region.

Information on the priority of the downlink data pended to the coupled STA may be information on a transmission priority of the pended downlink data to be transmitted to the coupled SA. A relationship between the serviceable STA (alternatively, awake-state STA) and the downlink data to be transmitted to the serviceable STA (alternatively, awake-state STA) may be managed based on a mapping table. For example, the mapping table may map the serviceable STA and the information on the priority of the downlink data pended to the serviceable STA. The AP may transmit the downlink data based on the awake-state STA included in the serviceable STA and the priority of the downlink data pended to the awake-state STA.

For example, when a plurality of awake-state STAs is provided, the AP may decide the awake-state STA mapped with the pended downlink data having a highest priority among the plurality of awake-state STAs as a transmission target STA. When the STA that transmits the current downlink data is not the transmission target STA, the AP may stop (alternatively, delay) the transmissions of the downlink data to the STA and transmit the downlink data to the transmission target STA.

For example, the AP may announce hold-off of downlink data 320 having the second priority pended to the STA in order to hold off transmission of the downlink data 320 having the second priority to the STA2 and perform transmission of downlink data 33 having the first priority to the STA1.

The AP may transmit a last downlink frame transmitted the STA2, which includes information indicating hold-off of transmission of the downlink frame (downlink data) before holding off the transmission of the downlink frame including the downlink data 320 having the second priority pended to the STA2. The last downlink frame transmitted before holding off the transmission of the downlink frame to the STA may be expressed as a term called a hold-off configuration downlink frame.

The hold-off configuration downlink frame may include a downlink transmission hold-off field (alternatively, a downlink transmission hold off indication) in order to hold off the transmission of the downlink frame. The downlink transmission hold-off field may be included in a control field (for example, a high throughput (HT) control field and a very high throughput (VHT) control field) of an MAC header of the downlink frame or included in a newly defined field.

For example, when a value of the downlink transmission hold-off field (alternatively, indication) is 1, the downlink transmission hold-off field (alternatively, indication) may indicate hold-off of the transmission of the downlink data. When the value of the downlink transmission hold-off field (alternatively, indication) is 0, the downlink transmission hold-off field may be reserved without being mapped with separate information.

Further, a hold off configuration downlink frame transmitted by the AP may include information on transmission resume of the transmission of the downlink frame (alternatively, downlink data). For example, the hold off configuration downlink frame may include information on a time of performing the transmission resume of the downlink data.

The information on a time (a downlink data transmission resuming time) of performing the transmission resuming of the downlink data may be transmitted while being included in a resume downlink transmission time field (alternatively, resume downlink transmission time information).

The resume downlink transmission time field may be transmitted while being included in a lower field of the control field (for example, the high throughput (HT) control field and the very high throughput (VHT) control field) of the MAC header of the downlink frame or included in the newly defined field. Alternatively, a value corresponding to a transmission opportunity (TXOP) limit included in a QoS control field included in the MAC header may be associated with the downlink data transmission resume time. The resume downlink data transmission time field may include information on duration up to a point of resuming the transmission of the downlink frame to the STA again after transmitting the hold off configuration downlink frame. As another expression, the resume downlink data transmission time field may include information on a configuration interval of the NAV after receiving the hold off configuration downlink frame. As yet another expression, the resume downlink data transmission time field may include information on duration up to a point when the STA is switched the awake state in order to monitor the downlink frame again from a point of receiving the hold off configuration downlink frame. Alternatively, the resume downlink data transmission time field may include information on a point of resuming the transmission of the downlink frame to the STA.

In detail, the STA2 wakes up earlier than the STA1 to transmit trigger frame 1 315 to the AP and thereafter, receive the downlink frame 320 including the downlink data having the second priority. The AP may decide hold-off of the transmission of the downlink data 320 having the second priority based on the point when the STA is switched to the awake state. In this case, the AP may transmit the hold off configuration downlink frame including the downlink transmission hold-off field and the resume downlink transmission time field. In FIG. 3, it is assumed that the downlink frame first transmitted to the STA2 after receiving the trigger frame 1 315 from the STA2 is the hold off configuration downlink frame.

The STA2 may receive the downlink transmission hold-off field having the value of 1 included in the hold off downlink frame and configure the NAV based on the resume downlink transmission time field. The STA2 may be switched to the doze state from the awake state and maintain the doze state during the NAV configuration interval. The STA2 may be switched to the awake state from the doze state again and monitor the downlink frame transmitted from the AP after the NAV configuration interval configured based on the resume downlink transmission time field.

The STA1 may transmit trigger frame 2 325 to the AP and thereafter, receive an ACK frame (not illustrated) and receive the downlink frame including the downlink data 330 having the first priority.

Figure 4:
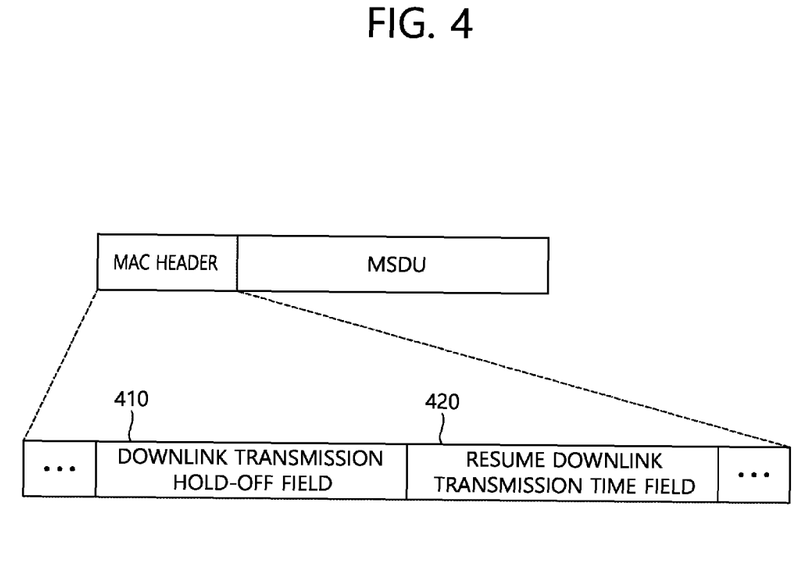
FIG. 4 is a conceptual view illustrating a downlink frame according to an embodiment of the present invention.

FIG. 4 is a conceptual view illustrating a downlink frame according to an embodiment of the present invention.

In FIG. 4, a downlink frame including a downlink transmission hold-off field 410 and a resume downlink transmission time field 420 is disclosed.

Referring to FIG. 4, the MAC header of the downlink frame may include the downlink transmission hold-off field and the resume downlink transmission time field.

According to the embodiment of the present invention, when the pended downlink data having the relatively high priority may be transmitted, the AP may hold off transmission of the pended downlink data having the relatively low priority, which is currently transmitted. The hold off configuration downlink frame transmitted before holding off the transmission of the pended downlink data having the relatively low priority may include the downlink transmission hold-off field and the resume downlink transmission time field.

The downlink transmission hold-off field 410 may include information indicating whether to hold off the transmission of the downlink frame.

The resume downlink transmission time field 420 may include information associated with the resume of the hold-off transmission of the downlink data.

The resume downlink transmission time field 420 may include information on duration up to a point of resuming the transmission of the downlink frame to the STA again after transmitting the hold off configuration downlink frame. As another expression, the resume downlink transmission time field 420 may include information on a configuration interval of the NAV (alternatively, a doze state maintaining interval) after receiving the hold off configuration downlink frame. As yet another expression, the resume downlink transmission time field 420 may include information on duration up to a point when the STA is switched the awake state in order to monitor the downlink frame again from the point of receiving the hold off configuration downlink frame. Alternatively, the resume downlink transmission time field 420 may include the information on the point of resuming the transmission of the downlink frame to the STA.

The transmission resume point of the downlink frame may be decided based on a transmissions completion prediction point of the pended downlink data having the relatively high priority when the transmission of the downlink data is held off. Similarly, the point when the STA is switched to the awake state or duration when the STA is operated in the doze state may be decided based on the transmissions completion prediction point of the pended downlink data having the relatively high priority when the transmission of the downlink data is held off.

Figure 5:
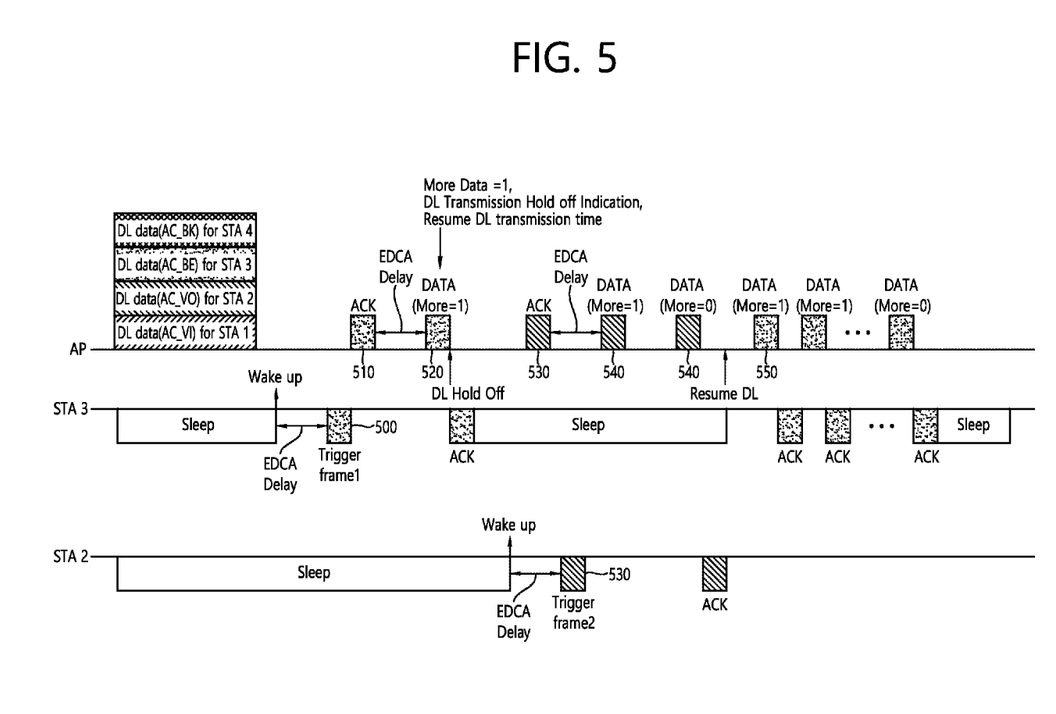
FIG. 5 is a conceptual view illustrating U-APSD according to an embodiment of the present invention.

FIG. 5 is a conceptual view illustrating U-APSD according to an embodiment of the present invention.

In FIG. 5, a method is disclosed, which holds off the pended downlink data having the relatively low priority, which is currently transmitted and transmits the pended downlink data having the relatively low priority when the AP may transmit the pended downlink data having the relatively high priority.

Referring to FIG. 5, the downlink data corresponding to the access category_video (AC_VI) to be transmitted to the STA1, the downlink data corresponding to the access category_voice (AC_VO) to be transmitted to the STA2, the downlink data corresponding to the access category_best effort (AC_BE) to be transmitted to STA3, and the downlink data corresponding to the access category_backgroud (AC_BK) to be transmitted to the STA4 may be pended to the AP.

The STA3 may wake up earlier than the STA2 and the STA3 may transmit trigger frame 1 500 to the AP. The AP may transmit an ACK frame 510 to the STA3 as a response to the trigger frame. The AP may transmit the ACK frame 510 and transmit pended downlink data for the STA3, which corresponds to AC_BE after a predetermined time (an enhanced distributed channel access (EDCA) delay).

As described above, the AP may find a switch time of the STA2 to the awake state based on the listen interval of the STA2. Further, the AP may also find even whether the STA is positioned within the service range of the AP based on the information indicating whether the STA that will receive the buffered (alternatively, pended) downlink data receives the buffered (alternatively, pended) downlink data.

When the priority of the downlink data pended with respect to the STA2 to be switched to the awake state is higher than the priority of the downlink data pended with respect to the STA3, which is currently transmitted, the AP may hold off (alternatively, delay) the transmission of the downlink data to the STA3.

The AP may transmit the hold off configuration downlink frame 520 to the STA3. In FIG. 5, the method is described by assuming that the downlink frame which is first transmitted is the hold off configuration uplink frame 520. The hold off configuration downlink frame 520 may include the downlink transmission hold-off field and the resume downlink transmission time field.

For example, the downlink transmission hold-off field included in the hold off configuration downlink frame 520 may indicate the hold-off of the transmission of the downlink data and the resume downlink transmission resume time field may include information on the point of resuming the transmission of the downlink data after transmitting (alternatively, receiving) the hold off configuration downlink frame 520.

The STA may receive the hold off configuration downlink frame 520 and be switched to the doze state from the awake state. The STA3 may configure the NAV and maintain the doze state during the predetermined time interval decided based on the resume downlink transmission time field.

The STA3 is switched to the awake state from the doze state after the NAV interval configured based on the resume downlink transmission time field to monitor a downlink frame 550 transmitted to the STA3 by the AP. Information included in the resume downlink transmission time field may be decided based on the transmission completion prediction time of the downlink data pended with respect to the STA2 that holds off the transmission of the downlink data pended with respect to the STA3.

The AP may transmit the hold off configuration downlink frame 520 to the STA3 and the AP may receive trigger frame 2 530 from the STA2. The STA2 may acquire the medium and transmit the trigger frame 2 530 to the AP when the communication between the AP and the STA3 stops. The AP may receive the trigger frame 2 530 from the STA2 and transmit an ACK frame 535 as a response to the trigger frame 2 530. The AP may transmit a downlink frame 540 to the STA2 after transmitting the ACK frame 535. When downlink data having a relatively higher priority than the downlink data pended with respect to the STA2 may not be transmitted, the AP may transmit the downlink data pended with respect to the STA2 to the STA2 without stop. The downlink frame 540 transferring the pended downlink data may include the moredata field. When the moredata field of the downlink frame 540 is 1, the moredata field of 1 may indicate that the downlink data yet pended with respect to the STA remains. When the moredata field of the downlink frame 540 is 0, the moredata field of 1 may indicate that the downlink data pended with respect to the STA yet remains.

The AP may transmit residual downlink data pended with respect to the STA3 after ending the transmission of the downlink data pended with respect to the STA2. The AP may transmit to the STA3 the downlink frame 540 including the residual downlink data pended with respect to the STA3.

That is, when it is assumed that the priority of first downlink data pended to the STA3 is lower than the priority of second downlink data pended to the STA2, an operating method of the AP based on the power save mode in the wireless LAN may be performed as below.

The AP may receive a first trigger frame that triggers transmission of the first downlink data pended with respect to the STA3 from the first STA and decide hold-off of the transmission of the first downlink data transmitted as a response to the first trigger frame based on the priority of the second downlink data pended with respect to the STA2 and the point when the STA2 is switched to the awake state. Further, the AP may transmit a hold off configuration frame indicating the hold-off to the STA3. The AP may transmit residual first downlink data after a resume point based on a resume time of the transmission of the pended first downlink data of the resume downlink transmission time field included in the hold off configuration frame. The residual first downlink data may include first downlink data other than the first downlink data transmitted before the hold-off among the pended downlink data.

In this case, the resume point may be decided based on a transmission completion point of the pended second downlink data and the switch point of the STA2 to the awake state may be duplicated with duration for transmitting the pended first downlink data.

According to the embodiment of the present invention, the downlink frame is transmitted by considering the priority of the pended downlink data even in the U-APSD procedure to reduce the service delay for the downlink data having the high priority.

Figure 6:
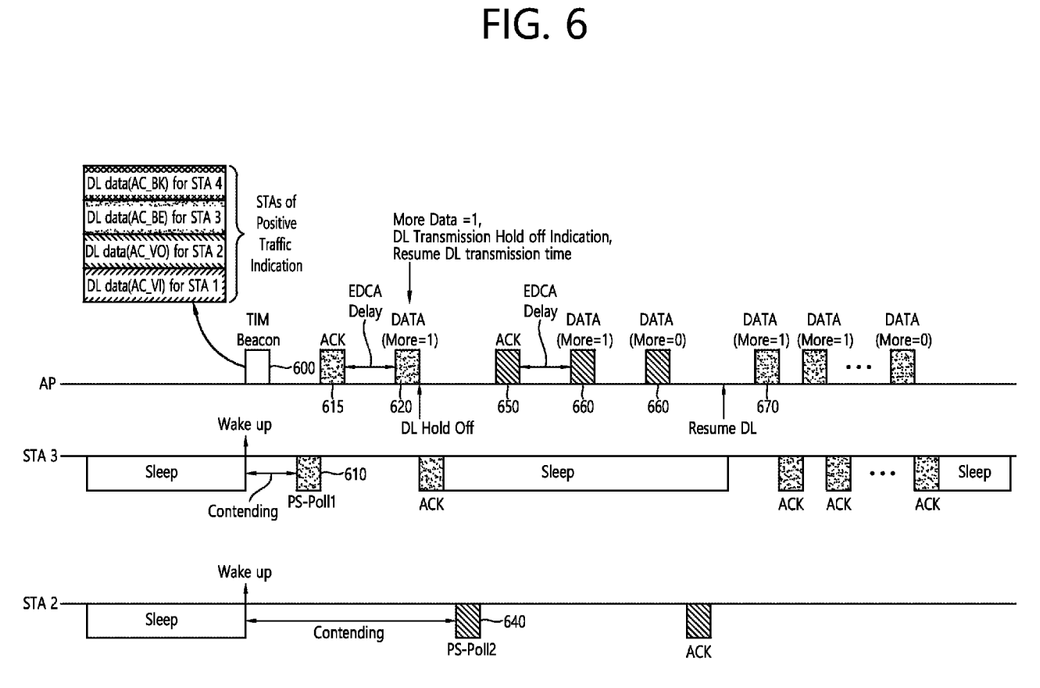
FIG. 6 is a conceptual view a method for reducing a service delay in a beacon frame based power save poll procedure according to an embodiment of the present invention.

FIG. 6 is a conceptual view a method for reducing a service delay in a beacon frame based power save poll procedure according to an embodiment of the present invention.

In FIG. 6, an action of the STA which is operated in the power saving mode based on a TIM of a beacon frame 600 is disclosed.

Referring to FIG. 6, the AP may transmit the beacon frame 600 to the STA1, the STA2, the STA3, and the STA4. The beacon frame 600 may include a traffic indication map (TIM) or a delivery traffic indication map (DTIM). The TIM may indicate existence of the downlink data to be transmitted based on unicast pended to the STA. The TIM may indicate existence of the downlink data to be transmitted based on unicast pended to the STA.

For example, the TIM of the beacon frame 600 may indicate the existence of the downlink data pended with respect to the STA1, the STA2, the STA3, and the STA4. When a traffic indication for the STA is set to 1 in the TIM, the traffic indication of 1 may indicate the existence of the downlink data pended to the STA.

Referring to FIG. 6, the downlink data corresponding to the access category_video (AC_VI) to be transmitted to the STA1, the downlink data corresponding to the access category_voice (AC_VO) to be transmitted to the STA2, the downlink data corresponding to the access category_best effort (AC_BE) to be transmitted to STA3, and the downlink data corresponding to the access category_backgroud (AC_BK) to be transmitted to the STA4 may be pended to the AP.

Each of the STA1, the STA2, the STA3, and the STA4 may receive the beacon frame 600 and find the existence of the downlink data pended based on the TIM included in the beacon frame 600. Each of the STA1, the STA2, the STA3, and the STA4 may receive the beacon frame 600 and access the media based on a contention (for example, EDCA).

In FIG. 6, a case in which the STA2 and the STA3 are in the awake state is disclosed for easy description. The AP may find the listen interval of each of the STA1, the STA2, the STA3, and the STA4. The listen interval of the STA that is operated in the power saving mode based on the TIM may be a receiving interval of the beacon frame 600. For example, the STA maintains the doze mode and thereafter, is switched to the awake mode from the doze mode during the receiving interval of the beacon frame 600 to receive the beacon frame 600. When the beacon frame is transmitted at a period of 100 ms, the listen interval may be a time interval of the unit of 100 ms.

The STA is switched to the awake mode based on the listen interval and receives the beacon frame 600 to determine whether a frame pended for the STA exists in the AP based on the TIM or DTIM included in the beacon frame. For example, when the TIM of the beacon frame indicates the existence of the frame pended for the STA, the STA maintains the awake mode and transmits the trigger frame to trigger the transmission of the pended frame. When the DTIM indicates the existence of the frame pended for the STA, the STA may monitor the frame transmitted to the STA by the AP without transmitting a separate trigger frame.

Contrary to this, when the TIM or DTIM of the beacon frame 600 does not indicate the existence of the frame pended for the STA, the STA may be switched to the doze mode from the awake mode.

In FIG. 6, the operation is described by assuming that the TIM of the beacon frame 600 indicates the existence of the downlink data pended with respect to the STA1, the STA2, the STA3, and the STA4.

When the STA3 accesses the medium earlier than the STA2, the STA3 may transmit power save (PS)-poll frame 1 610 to the AP through the medium.

Since the AP finds the listen interval of the STA2, the STA2 may find that the STA2 is also in the awake mode and the downlink data may be transmitted to the STA2. The transmission priority of the downlink data pended with respect to the STA2 may be higher than the transmission priority of the downlink data pended with respect to the STA3. In this case, the downlink frame which the AP transmits after receiving the PS-Poll frame 610 transmitted by the STA3 may be a hold off configuration downlink frame 620. That is, the AP may transmit a hold off configuration downlink frame 620 including the downlink transmission hold-off field and the resume downlink transmission time field.

The STA3 may receive the hold off configuration downlink frame 620 and is switched to the doze state and the STA3 may configure the NAV and maintain the doze state during a predetermined time interval based on the resume downlink transmission time field. The STA3 is switched to the awake mode after the NAV interval configured based on the resume downlink transmission time field to monitor a downlink frame 670 transmitted to the STA3 by the AP.

The AP may transmit the hold off configuration downlink frame 620 to the STA3 and receive PS-Poll frame 2 640 from the STA2. The STA2 may acquire the medium and transmit the PS-Poll frame 2 640 to the AP when the communication between the AP and the STA3 stops. The AP may receive the PS-poll frame 2 640 from the STA2 and transmit an ACK frame 650 as a response to the PS-poll frame 2 640. The AP may transmit a downlink frame 660 to the STA2 after transmitting the ACK frame 650. When downlink data having the relatively higher transmission priority than the downlink data pended with respect to the STA2 may not be transmitted, the AP may transmit the downlink frame 660 to the STA2 without stopping the transmission of the downlink data pended with respect to the STA2.

In the aforementioned embodiment, it is assumed that the downlink transmission hold-off field and the resume downlink transmission time field are included in the hold off configuration downlink frame, but the downlink transmission hold-off field and the resume downlink transmission time field may be included in hold off configuration ACK frames 510 and 615.

Figure 7:
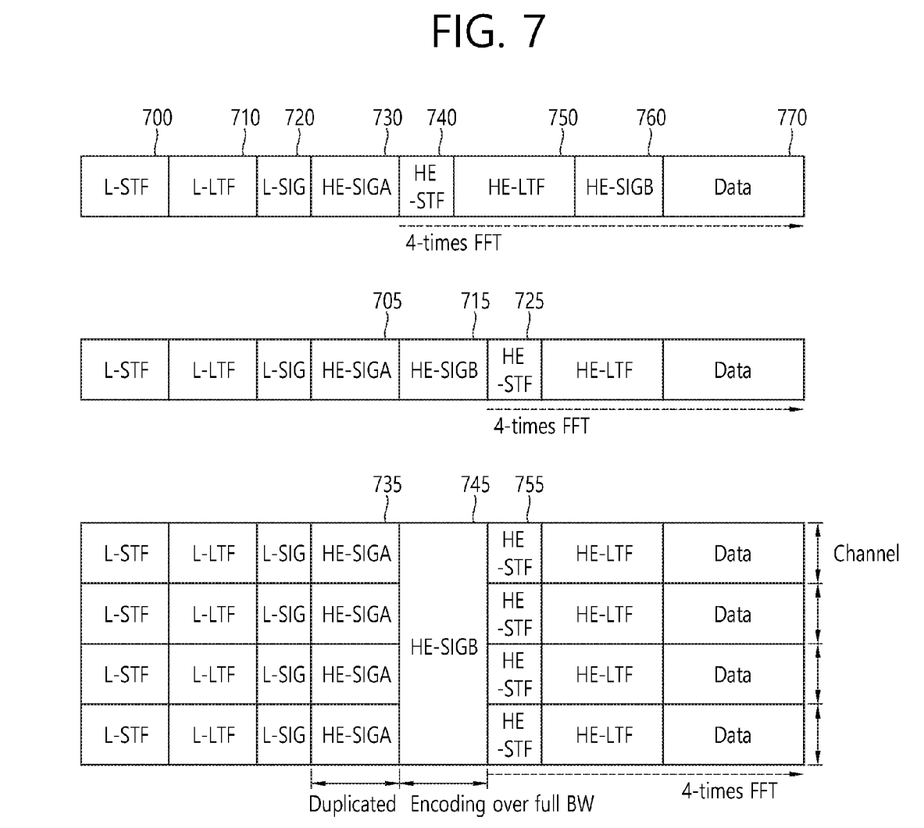
FIG. 7 is a conceptual view illustrating a PPDU format transferring a frame according to an embodiment of the present invention.

FIG. 7 is a conceptual view illustrating a PPDU format transferring a frame according to an embodiment of the present invention.

In FIG. 7, the PPDU formation according to the embodiment of the present invention is disclosed. The PPDU may include a PPDU header and a MAC protocol data unit (MPDU) (alternatively, a physical layer service data unit (PSDU)). The frame may correspond to the MPDU. The PPDU header of the PPDU format may be used as a meaning including a PHY header and a PHY preamble of the PPDU.

The PPDU format illustrated in FIG. 7 may be used for carrying a downlink frame, a trigger frame, a PS-poll frame, and an ACK frame.

Referring to the upper side of FIG. 7, the PPDU header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal-B (HE-SIG B). From the PHY header to the L-SIG may be classified into a legacy part, a high efficiency (HE) part after the L-SIG.

An L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length.

An HE-SIG A 730 may include identification information on an STA for indicating a target STA to receive the downlink PPDU. The STA may determine whether the information included in the HE-SIG A 730 receives the PPDU based on the identification information of the target STA. When the STA is indicated based on the HE-SIG A 730 of the downlink PPDU, the STA may perform additional decoding for the downlink PPDU. Further, the HE-SIG A 730 may include information on a resource to receive the downlink data (a frequency resource (alternatively, a sub band) (in orthogonal frequency division multiplexing (OFDMA)-based transmission) or in a multiple input multiple output (MIMO)-based transmission)).

In the aforementioned embodiment, it is illustrated that the downlink transmission hold off field and the resume downlink transmission time field are included in the frame field, but the downlink transmission hold off field and the resume downlink transmission time field may be included in the HE-SIG A 730.

An HE-STF 740 may be used for improving automatic gain control estimation in an MIMO environment or an OFDMA environment.

An HE-LTF 750 may be used for estimating a channel in the MIMO environment or the OFDMA environment.

An HE-SIG B 760 may include information on a length modulation and coding scheme (MCS) of the physical layer service data unit (PSDU) for each STA, a tail bit, and the like.

A size of the inverse fast Fourier transform (IFFT) applied to the HE-STF 740 and the field after the HE-STF 740, and a size of the IFFT applied to the field before the HE-STF 740 may be different from each other. For example, a size of the IFFT applied to the HE-STF 740 and the field after the HE-STF 740 may be four times larger than the size of the IFFT applied to the field before the HE-STF 740. When the STA receives the downlink frame, the STA decodes the HE-SIG A 730 in the downlink frame and may determine whether to decode the field after the HE-SIG A 730 based on the identification information of the target STA included in the HE-SIG A 730. In this case, when the identification information of the target STA included in the HE-SIG A 730 indicates an identifier of the STA, the STA may perform decoding based on the FFT size changed from the HE-STF 740 and the field after the HE-STF 740. On the contrary, when the identification information of the target STA included in the HE-SIG A 730 does not indicate the identifier of the STA, the STA may stop the decoding and set a network allocation vector (NAV). A cyclic prefix (CP) of the HE-STF 740 may have a larger size than the CP of another field and the during the CP period, the STA may perform the decoding for the downlink PPDU by changing the FFT size.

An order of the field configuring the format of the PPDU illustrated in the upper side of FIG. 7 may be changed. For example, as illustrated in the stop of FIG. 7, a HE-SIG B 715 of the HE part may be positioned immediately after the HE-SIG A 705. The STA decodes up to the HE-SIG A 705 and the HE-SIG B 715 and receives required control information to set the NAV. Similarly, the size of the IFFT applied to the HE-STF 725 and the field after the HE-STF 725 may be the same as the size of the IFFT applied to the field before the HE-STF 1725.

The STA may receive the HE-SIG A 705 and the HE-SIG B 715. When the reception of the downlink PPDU is indicated by the identifier of the target STA of the HE-SIG A 705, the STA may perform the decoding for the downlink PPDU by changing the FFT size from the HE-STF 725. On the contrary, when the STA receives the HE-SIG A 705 and the reception of the downlink PPDU based on the HE-SIG A 705 is not indicated, the NAV may be set.

Referring to the bottom of FIG. 7, the downlink PPDU formation of downlink (DL) multi-user (MU) transmission is illustrated. The downlink PPDU may be transmitted to the STA through a different downlink transmission resource (a frequency resource or a spatial stream) based on the OFDMA. That is, the downlink data may be transmitted to a plurality of STAs through a plurality of sub bands based on the downlink PPDU format for the DL MU transmission. In the aforementioned embodiment, it is assumed that the AP transmits a downlink frame to one STA. However, according to another embodiment of the present invention, even in the case of the U-APSD, the downlink data may be transmitted to the plurality of STAs in an awake state in the downlink PPDU format for the DL MU transmission.

On the downlink PPDU, a previous field of the HE-SIG B 745 may be transmitted from a different downlink transmission resource in a duplicated form. A HE-SIG B 745 may be transmitted in an encoded form on the entire transmission resource. A field after the HE-SIG B 745 may include individual information for the plurality of STAs receiving the downlink PPDU.

When the field included in the downlink PPDU is transmitted through the downlink transmission resource, the CRC for each field may be included in the downlink PPDU. On the contrary, when a specific field included in the downlink PPDU is encoded on the entire downlink transmission resource and transmitted, the CRC for each field may not be included in the downlink PPDU. Accordingly, the overhead for the CRC may be reduced. That is, the downlink PPDU format for the DL MU transmission according to the embodiment of the present invention uses the HE-SIG B 745 in the encoded form on the entire transmission resource to reduce the CRC overhead of the downlink frame.

Like the downlink PPDU format for the DL MU transmission, the HE-STF 755 and the field after the HE-STF 755 may be encoded based on the different IFFT size from the field before the HE-STF 755. Accordingly, when the STA receives the HE-SIG A 735 and the HE-SIG B 745 and indicates the reception of the downlink PPDU based on the HE-SIG A 735, the STA may perform the decoding for the downlink PPDU by changing the FFT size from the HE-STF 755.

Figure 8:
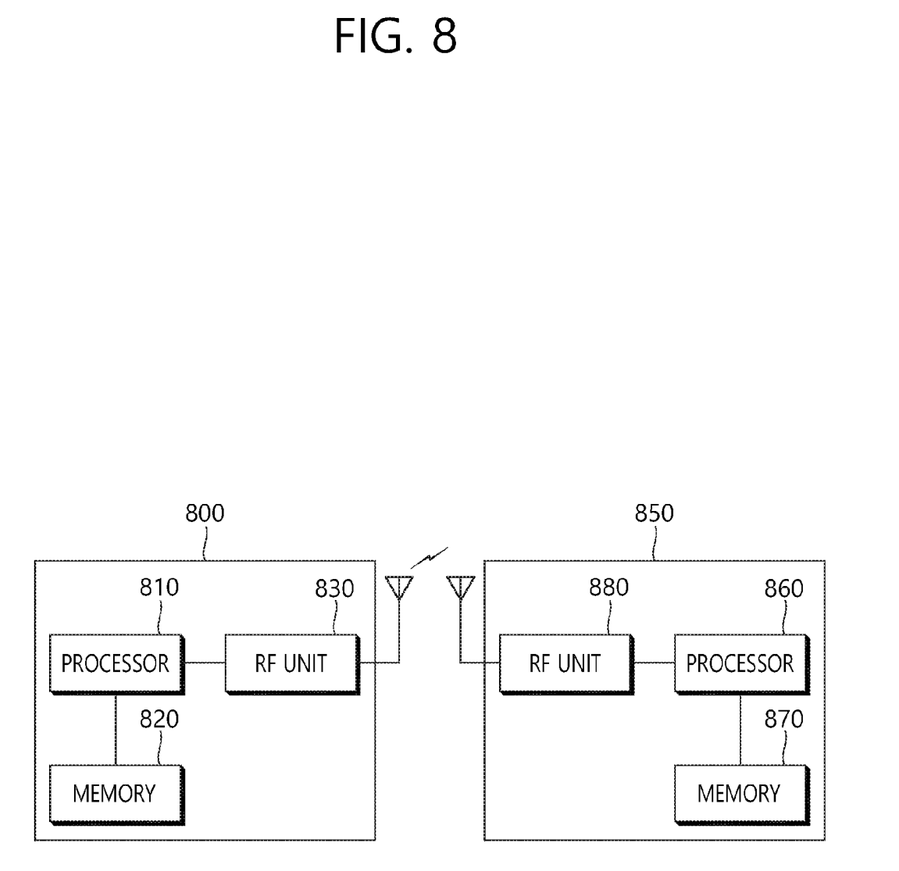
FIG. 8 is a block diagram illustrating a wireless apparatus to which an embodiment of the present invention can be applied.

FIG. 8 is a block diagram illustrating a wireless apparatus to which an embodiment of the present invention can be applied.

Referring to FIG. 8, the wireless apparatus 800 as an STA capable of implementing the aforementioned embodiment may be an AP 800 or a non-AP station (alternatively, STA) 850.

The AP 800 may include a processor 810, a memory 820, and a radio frequency (RF) unit 830.

The RF unit 830 is connected with the processor 810 to transmit and/or receive a radio signal.

The processor 810 may implement a function, a process, and/or a method which are proposed in the present invention. For example, the processor 810 may be implemented to perform an operation of the wireless apparatus according to the embodiment of the present invention. The processor may perform the operation of the wireless apparatus disclosed in the embodiment of FIGS. 2 to 7.

For example, the processor 810 may be implemented to receive the first trigger frame triggering the transmission of the first downlink data buffered with respect to the first STA from the first STA, decide hold-off of the transmission of the first downlink data transmitted as a response to the first trigger frame based on a first priority of the first downlink data buffered with respect to the first STA, a second priority of the second downlink data buffered with respect to the second STA, and the switch point of the second STA to the awake state, and transmit the hold off configuration frame to the first STA. The first priority may be lower than the second priority and the switch point may be duplicated with duration for transmitting the buffered first downlink data.

The first priority may be decided based on first access category of the buffered first downlink data, the second priority may be decided based on second access category of the buffered second downlink data, and the first access category and the second access category may be one of access category (AC)_background (BK), AC_best effort (BE), AC_video (VI), and AC_voice (VO).

The STA 850 may include a processor 860, a memory 870, and a radio frequency (RF) unit 880.

The RF unit 880 is connected with the processor 860 to transmit and/or receive the radio signal.

The processor 860 implements a function, a process, and/or a method which are proposed in the present invention. For example, the processor 820 may be implemented to perform the operation of the wireless apparatus according to the embodiment of the present invention. The processor may perform the operation of the wireless apparatus disclosed in the embodiment of FIGS. 2 to 7.

For example, the processor 860 may configure the NAV when transmitting the trigger frame and receives the hold off configuration frame. Further, the processor 860 is switched to the awake mode based on a resume point of transmitting the pended first downlink data including the resume downlink transmission time field included in the hold off configuration frame to monitor the downlink frame transmitted from the AP.

The processors 810 and 860 may include an application-specific integrated circuit (ASIC), other chipset, a logic circuit, a data processing device, and/or a converter that converts a baseband signal and the radio signal to each other. The memories 820 and 870 may include a read-only memory (ROM), a random access memory (RAM), a flash memory, a memory card, a storage medium, and/or other storage devices. The RF units 830 and 880 may include one or more antennas that transmit and/or receive the radio signal.

When the embodiment is implemented by software, the aforementioned technique may be implemented by a module (process, function, and the like) performing the aforementioned function. The module may be stored in the memories 820 and 870 and executed by the processors 810 and 860. The memories 820 and 870 may be positioned inside or outside the processors 810 and 860 and connected with the processors 810 and 860 through various well-known means.

What is claimed is:

1. A method for operating based on a power save mode in a wireless LAN, the method comprising:
   receiving, by an access point (AP), a first trigger frame triggering transmission of first downlink data buffered with respect to a first station (STA) from the first STA;
   deciding, by the AP, hold-off of the transmission of the first downlink data transmitted as a response to the first trigger frame based on a first priority of the first downlink data buffered with respect to the first STA, a second priority of second downlink data buffered with respect to a second STA, and a switch point to the second STA; and
   transmitting, by the AP, a hold off configuration frame indicating the hold-off to the first STA,
   wherein the first priority is lower than the second priority, and
   the switch point is duplicated with duration for transmitting the buffered first downlink data.

2. The method of claim 1, wherein:
   the hold off configuration frame includes a downlink transmission hold-off field and a resume downlink transmission time field,
   the downlink transmission hold-off field includes information indicating the hold-off, and
   the resume downlink transmission time field includes information on a resume point of the transmission of the buffered first downlink data.

3. The method of claim 2, further comprising:
   transmitting, by the AP, residual first downlink data after the resume point,
   wherein the residual first downlink data includes first downlink data other than the first downlink data transmitted before the hold-off among the buffered downlink data.

4. The method of claim 3, wherein the resume point is decided based on a transmission completion point of the buffered second downlink data.

5. The method of claim 1, further comprising:
   receiving, by the AP, a second trigger frame triggering transmission of second downlink data buffered with respect to a second STA from the second STA; and
   transmitting, by the AP, the buffered second downlink data to the second STA as a response to the second trigger frame.

6. The method of claim 1, wherein:
   the first priority is decided based on first access category of the buffered first downlink data,
   the second priority is decided based on second access category of the buffered second downlink data, and
   the first access category and the second access category are one of access category_backgroud (AC_BK), access category_best effort (AC_BE), AC_video (VI), and AC_voice (VO).

7. An access point (AP) for operating based on a power save mode in a wireless LAN, the AP comprising:
   a radio frequency (RF) unit implemented to transmit or receive a radio signal; and
   a processor operatively connected with the RF unit,
   wherein the processor is implemented to receive a first trigger frame triggering transmission of first downlink data buffered with respect to a first station (STA) from the first STA,
   decide hold-off of the transmission of the first downlink data transmitted as a response to the first trigger frame based on a first priority of the first downlink data buffered with respect to the first STA, a second priority of second downlink data buffered with respect to a second STA, and a switch point to the second STA, and
   transmit a hold off configuration frame indicating the hold-off to the first STA,
   the first priority is lower than the second priority, and
   the switch point is duplicated with duration for transmitting the buffered first downlink data.

8. The AP of claim 7, wherein:
the hold off configuration frame includes a downlink transmission hold-off field and a resume downlink transmission time field,
the downlink transmission hold-off field includes information indicating the hold-off, and
the resume downlink transmission time field includes information on a resume point of the transmission of the buffered first downlink data.

9. The AP of claim 8, wherein:
the processor is implemented to transmit residual first downlink data after the resume point, and
the residual first downlink data includes first downlink data other than the first downlink data transmitted before the hold-off among the buffered downlink data.

10. The AP of claim 9, wherein the resume point is decided based on a transmission completion point of the buffered second downlink data.

11. The AP of claim 7, wherein:
the processor is implemented to receive a second trigger frame triggering transmission of second downlink data buffered with respect to a second STA from the second STA, and
transmit the buffered second downlink data to the second STA as a response to the second trigger frame.

12. The AP of claim 7, wherein:
the first priority is decided based on first access category of the buffered first downlink data,
the second priority is decided based on second access category of the buffered second downlink data, and
the first access category and the second access category are one of access category_backgroud (AC_BK), access category_best effort (AC_BE), AC_video (VI), and AC_voice (VO).

* * * * *